United States Patent

[11] 3,528,396

| [72] | Inventor | Clessie L. Cummins<br>P.O. Box 785, Sausalito, California 94965 |
|---|---|---|
| [21] | Appl. No. | 844,687 |
| [22] | Filed | April 14, 1969<br>Division of Ser. No. 704,115,<br>Feb. 8, 1968, pending |
| [45] | Patented | Sept. 15, 1970 |

[54] INTERNAL COMBUSTION ENGINE
10 Claims, 11 Drawing Figs.

[52] U.S. Cl. .................................................. 123/191
[51] Int. Cl. .......................................................F02b 75/26,
F02b 77/00
[50] Field of Search .................................... 123/191,
58, 189, 65/(Cursory)

[56] References Cited
UNITED STATES PATENTS

| 746,925 | 12/1903 | Crane | 123/51(A)UX |
| 1,166,714 | 1/1916 | Ramesh | 123/51 |
| 1,206,715 | 11/1916 | Jones | 123/51 |
| 1,390,416 | 9/1921 | Wolf | 123/51 |
| 1,601,344 | 9/1926 | Burtnett | 123/65 |

FOREIGN PATENTS

| 104,307 | 6/1938 | Australia | 123/51(A)UX |
| 299,024 | 5/1954 | Switzerland | 123/51(A)UX |
| 488,421 | 11/1912 | France | 123/58(B3)UX |
| 496,541 | 7/1954 | Italy | 123/51(A)UX |
| 513,554 | 11/1930 | Germany | 123/90(E)UX |

*Primary Examiner*—Wendell E. Burns
*Attorney*—Owen, Wickersham and Erickson

ABSTRACT: This two-cycle or four-cycle Z-crankshaft engine has several pairs of opposed pistons symmetrically reciprocating in open-end cylinders. The combustion chamber lies mainly to one side at the center of each cylinder in an exhaust-valve housing, which also carries the exhaust and intake ports. Where fuel injection is used, a flat fan-like spray substantially fills the flat generally fan-shaped combustion chamber. The exhaust-valve housing, intake-valve cage and a pair of stem-aligning assemblies are removable as a unit with their valves, for maintenance or repair or replacement, with subsequent disassembly quite simple. A simple, oblong ring gasket between the exhaust-valve housing and the cylinder casting is the only gasket at or near the combustion chamber, and it is quite small in area. Timing of the valves and injector or ignition is by a cam-operated hydraulic system. The complete engine is readily assembled from relatively inexpensive components; each cylinder can be a separate and relatively inexpensive casting, as can be each intake-valve cage and exhaust-valve housing, and all such cylinders are identical, as are all intake-valve cages and all exhaust-valve housings.

Patented Sept. 15, 1970

INVENTOR.
CLESSIE L. CUMMINS

Owen, Wickersham & Erickson
ATTORNEYS

INVENTOR.
CLESSIE L. CUMMINS

ATTORNEYS

FIG. 3

INVENTOR.
CLESSIE L. CUMMINS

Owen, Wickersham & Erickson
ATTORNEYS

Patented Sept. 15, 1970

INVENTOR.
CLESSIE L. CUMMINS

Owen, Wickersham & Erickson
ATTORNEYS

FIG. 6

INVENTOR.
CLESSIE L. CUMMINS

Owen, Wickersham & Erickson
ATTORNEYS

INVENTOR.
CLESSIE L. CUMMINS

Owen, Wickersham & Erickson
ATTORNEYS

INTERNAL COMBUSTION ENGINE

This application is a division of application Ser. No. 704,115, filed February 8, 1968.

This invention relates to a novel combustion chamber for an improved internal combustion engine of the type in which two opposed pistons move symmetrically in each cylinder toward and away from each other.

The engine of this invention is a radical departure from conventional internal combustion engines and contains many novel features, including novel cylinders, the combustion chambers, the valve housings and assemblies, the Z-crankshaft, the cam-actuated hydraulic timing and actuation of valves and injectors or igniters, and the lubrication system.

Conventional engines have had to be relatively bulky and heavy, and have required large, heavy engine blocks, which have been very expensive to manufacture, and have required a great many expensive machine tools. The present invention has among its objects the provision of an engine which is small in bulk relative to its power, is light in weight relative to its life, is relatively free from vibration, enables the use of many identical parts, and has no large, heavy engine block and therefore does not require the manufacturer to maintain a heavy extensive line of machine tools. This object may be achieved partly by the use of a separate casting for each cylinder, all identical, and by separate and identical castings for each exhaust-valve housing and for each intake-valve cage, and by a novel assembled Z-crankshaft with novel converter plates.

Maintenance has long been a problem with engines and has been expensive whenever it involved the removal and replacement of the valves, because this usually involved the dismantling of the engine head, replacement of gaskets, etc. Other objects of the present invention, therefore, are to provide an engine which costs less to maintain, and for which minor repairs, including valve jobs, are relatively inexpensive. The present invention enables the removal and replacement of the valves without having to dismantle an engine head and related parts —since there is no engine head, as the term is usually used— and it eliminates head-gasket troubles.

Heretofore, diesel engines had difficulties because the cylinder head could be no larger than the bore, so that the area was too small to give the needed area for air ports and valves, and the problem was aggravated by having to put the fuel injector in the center of the two or four valves, in order to obtain high performance. Such crowding of injector and valves tended to weaken the head, and eventually often resulted in a bad crack that ruined the head. My new invention, as applied to a diesel engine, provides a combustion chamber having two sides, one for intake valves and one for exhaust valves, both unencumbered by an injector, which is located in an end wall and gives even more efficient burning than in conventional diesels. Moreover, the valves can be as large as desired without seriously weakening the combustion chamber walls, and the injector can be as large as desired and can therefore be properly designed to afford adequate room for all of its component parts.

Hence, whereas diesel engines heretofore had to rely on costly blowers or superchargers to force enough air through their restricted intake valves, my invention produces more power than prior-art diesel engines without blowers or superchargers, and a blower or supercharger can be used, if desired, to get still more power than prior-art supercharged engines.

Also, the prior-art location of the injector between the valves has required compromises as to the space consumed by the valves and the injector, usually causing both to suffer and at the same time weakening the head castings, where the highest heat and stresses are found. The life of injector check valves and other injector parts has been shortened. In my invention, the injector is located in a separate wall where the right size and shape is available, and both the valves can also be the optimum size, for each has its own wall—an injector wall, an intake-valve wall, and an exhaust-valve wall. The fourth side is open to a space in the cylinder between the two pistons. This structure confines the fuel-air mixture into a limited space of such size and shape as give the highest combustion efficiency.

One of the problems with current engines has been their relatively inefficient combustion in comparison with what is theoretically possible. This has been due partly to incomplete combustion, partly to the large heat losses involved, and partly to combustion losses and other loss factors tending to reduce the effective power of the engine relative to the amount and quality of combustion that is obtained. An object of the present invention is to greatly improve the efficiency of combustion, to reduce heat losses to the exhaust and to the engine cooling system, combustion losses, friction losses, and other loss factors that have reduced power, and thereby to increase the engine efficiency. Better injection equipment improves combustion, smaller bearing area reduces friction losses, and the side thrust in the pistons is substantially eliminated. The net result is much lower fuel consumption for a given power output.

It is now widely recognized that the large area occupied by combustion chamber linings has been a major source of smog-producing gases and vapors. In conventional engines cold fuel particles have struck these linings as atomized liquid particles and could not burn until they were vaporized, and their vaporization often took place so late in the power stroke that the exhaust valve was then open, and the smoldering fuel went out into the air unburned—a significant source of smog. Hence, reduction of the wall area of the combustion chamber is very desirable. It is accomplished in my invention by doing away with the conventional cylinder heads. In their place are provided the opposed pistons, each of which serves as a head for the other. They nearly touch at the peak of their compression strokes. The compressed air is thus forced into a flat, engineered chamber of optimum shape for the best combustion. The present invention makes possible a reduction to a minimum of the area of the combustion chamber for any given size of engine, with a consequent lowering of the fuel consumption.

Also, in a gasoline carburetor-type engine of this invention, where the fuel-air mixture enters through the intake valves, it is projected across the narrow combustion chamber against the very hot exhaust valves and the very hot walls surrounding them, so that the fuel is more quickly vaporized and burned. As a result, in a carburetted gasoline engine of this invention more of the introduced fuel is converted into useful power and less into noxious, smog-producing gases. A further beneficial result is that the cool fuel-air mixture has the effect of cooling the hot exhaust valves, thereby adding to their life.

In a fuel-injection engine of this invention, the fuel is introduced as a flat fan-shaped spray that fills the flat fan-shaped combustion chamber evenly, giving cleaner and more rapid combustion. The chamber is reduced to the minimum volume required for the desired compression ratio.

A particular problem with engines presently in use and especially with high-compression engines has been their inability to idle smoothly except at relatively high speeds. This has been due to the fact that in such engines the cylinder heads have, due to the crank angle, had a tendency to lean away as the piston moved on its compression stroke, and when the piston reached its top dead center and the charge was fired, then the cylinder had a tendency to rock even more in the opposite direction due to the opposite angularity of the crank. This has resulted in a vicious back-and-forth movement that has had a very detrimental effect on the engines and on their mountings, as well as on the vehicle or ship where the engine is installed. The problem of not being able to idle at low speeds is particularly severe in marine applications, where the engine shakes the boat so much when idling in gear that a boat has to drift into its berth with the engine out of gear and therefore with the ship practically rudderless. The present invention solves this problem and provides a new system where it is possible to idle smoothly at relatively low speeds. By including in it the new fuel system set forth in my U.S. Pat. Nos. 2,984,230; 2,984,231; 2,997,993; 3,119,381; 3,131,866; 3,143,104 and 3,185,140, it is possible for the pump to reduce the charge of fuel to an amount suitable for a very slow idle speed and to obtain a proper balance even during the slow idle speed.

The complexity of conventional engines is well known. For example, on a standard Cummins engine having six cylinders, there are 18 cams, 18 lower rocker-levers, 18 upper rocket-levers, 18 adjusting screws, 18 nuts, 18 push rods, and many more small parts, including rocker shafts, rocker housing castings, etc.; and on eight-cylinder engines there are 24 of each of these elements. A significant object of the present invention is to provide an engine which is markedly simpler than those now in use, is also simpler to set up and to tool for initial manufacture, and is simpler in the continuing manufacturing process. In contrast to the number of parts just listed, a typical engine of the present invention has three cylinders with six pistons in them —equivalent to a six-cylinder engine— and has only three cams, three master plungers, three plunger chambers, and nine hydraulic conduits—and this takes care of all the intake valves, the exhaust valves, and the fuel injector or igniter. It can be appreciated that this greatly reduces the number of parts. A five-cylinder, ten-piston engine still has only three cams, with 15 hydraulic conduits. There are two pistons in each cylinder, and they share in common one set of intake valves, one set of exhaust valves, and one fuel combustion means, such as one injector or one spark plug system, and each of these elements can be made in a simple form without having to conquer the difficulties involved in large engine heads; moreover, their form may be more efficient as well as simpler.

A feature of the engine of this invention is that there is never any adjustment to be made to clearances between the valves and the valve actuators, since there are no such clearances with my new hydraulic system. Another feature is that the engine noise has been greatly reduced, so that there is very little sound from the operation of the various parts, and the wear rate is greatly reduced.

To summarize the invention briefly, my new engine may be called a Z-crank, opposed piston engine. It can be operated as a four-cycle or two-cycle engine. Each cylinder contains two pistons which are opposed to each other; they move toward each other for firing and away from each other after firing. Preferably, especially for four-cycle operation, the engine has an odd number of cylinders, for example, three, five, or seven cylinders, with twice as many pistons. All the cylinders are identical, and all the pistons are identical; moreover, they are very simple in structure, resulting in elimination of the need for the large, heavy type of engine-block casting heretofore in use, though a block-casting may be used, if desired. Each cylinder may comprise a separate, rather simple casting, instead of a portion of a complex engine block in which a number of cylinders are bored. The combustion chamber of the engine is provided at the point where the two pistons meet in the center of the cylinder and extends out beyond the cylinder to one side thereof. Its shape is preferably flattened for achieving substantially ideal combustion with minimum exposed area, and to provide wide wall areas for the intake and exhaust valves. These valves are so arranged as to be easily dismounted from the cylinder without having to disturb the cylinders themselves. The structure of the valve housings is a very significant portion of the invention, as will be understood from the detailed description that follows. The timing of the valves and firing of the engine is also quite important and is quite simple, being accomplished hydraulically in a very simple manner with the aid of a minimum number of cams operating at one-half the crankshaft speed. As a result, it is quite practical to operate the engine as a four-cycle engine; two-cycle operation is also feasible if desired, the cams then operating at crankshaft speed.

Other objects and advantages of the invention will become apparent from the following description of a preferred form of the invention.

The drawings show the engine in a simplified depiction, without placing stress on relatively obvious refinements of portions thereof, such as counterweighting. By way of example, a three-cylinder, six-piston engine is herein described, and it will be understood that basically the same factors with the obvious differences would apply to a five-cylinder, 10-piston engine, or to a seven-cylinder, 14-piston engine.

Figure 1:
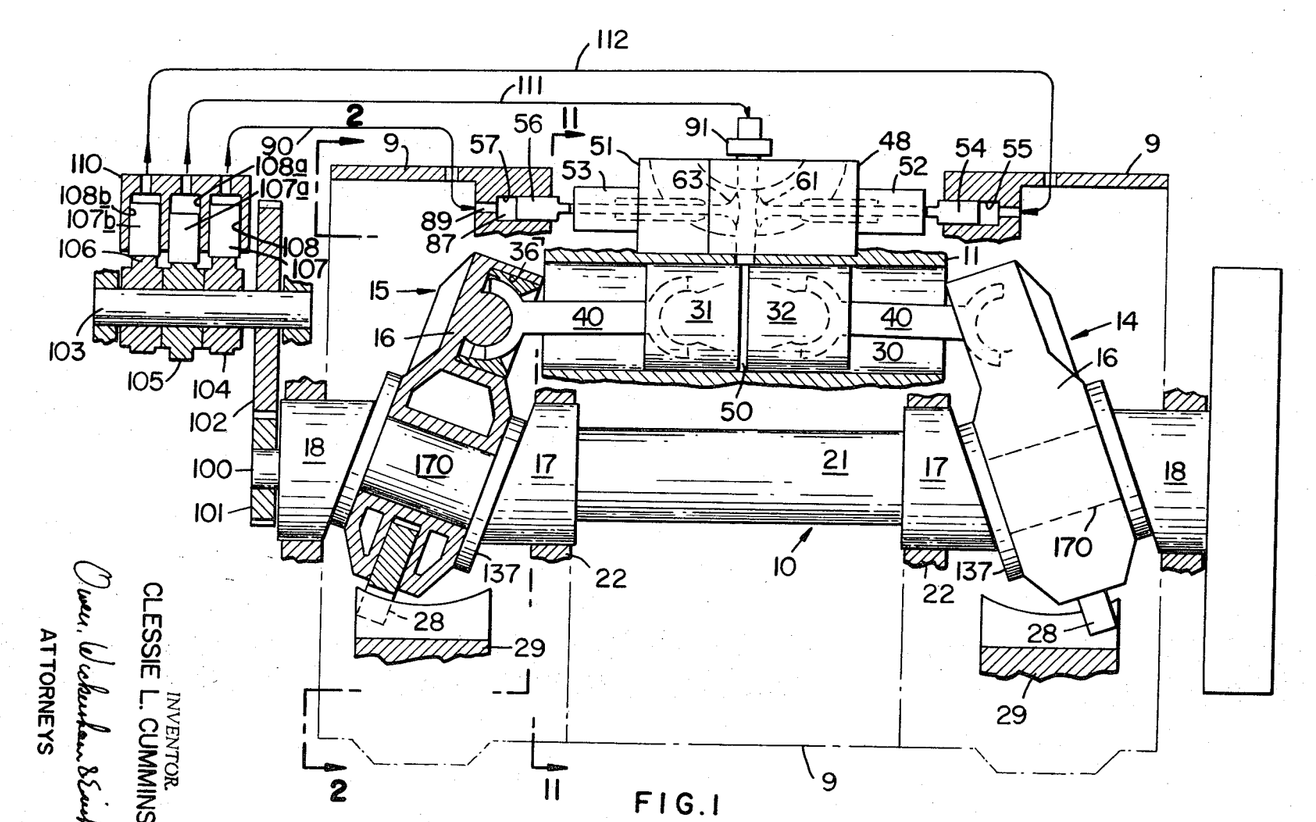
FIG. 1 is a simplified view in side elevation and partly in section of a three-cylinder engine embodying the principles of the invention, showing one cylinder thereof. It can be considered as taken along the line 1—1 in FIG. 2, with some parts broken or omitted.

An engine housing 9 (FIG. 1) surrounds a central crankshaft 10 and three cylinder bodies 11, 12, and 13. The crankshaft 10 carries and is driven by a pair of thrust converters 14 and 15, each of which may, for example, comprise a generally flat, generally triangular member 16. In the crankshaft 10, each of a pair of crank pins 170 (see FIG. 1) is placed at an angle between a pair of inner and outer crank webs 17 and 18, giving the appearance of a Z at each location, so that the crankshaft 10 is herein called a Z-crankshaft. The two inner webs 17 are joined to each other by a central tubular hollow cylindrical crankshaft portion 20 that rotates inside a simple tubular housing member 21 (see FIG. 7). Each of the thrust converters 14, 15 is mounted on a crank pin 170 (FIG. 1). Other structures may be used, but there are advantages in the structure shown. Each inner crank web 17 (see FIG. 7) may rotate inside a simple tubular housing member 22 that may be readily assembled to the member 21, as by means of a flange 23 on each end of the member 21. The tubular crankshaft portion 20 preferably has an end plate 24 at each end welded to the tube 20, and a central lubrication conduit 25 may extend between and preferably be welded to the end plates 24. The crankshaft portion 20 may be anchored at each end to its inner crank webs 17, as by a perforate ring 26 which may be doweled and bolted to both the end plate 24 and the crank web 17. The crank webs 17 and 18 may be both doweled to their crank pins 170, and the three elements may also be held together by a bolt 27. Each converter unit 16 may be provided with a projecting rod 28 which reciprocates in a channel provided by a stationary guide member 29, which is anchored to the main engine case 9.

Figure 2:
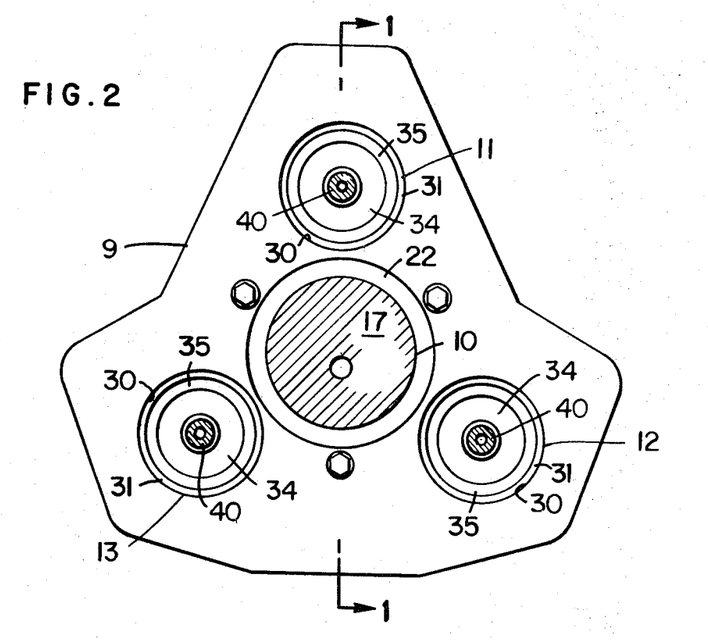
FIG. 2 is a view in section taken along the line 2—2 in FIG. 1.
Figure 3:
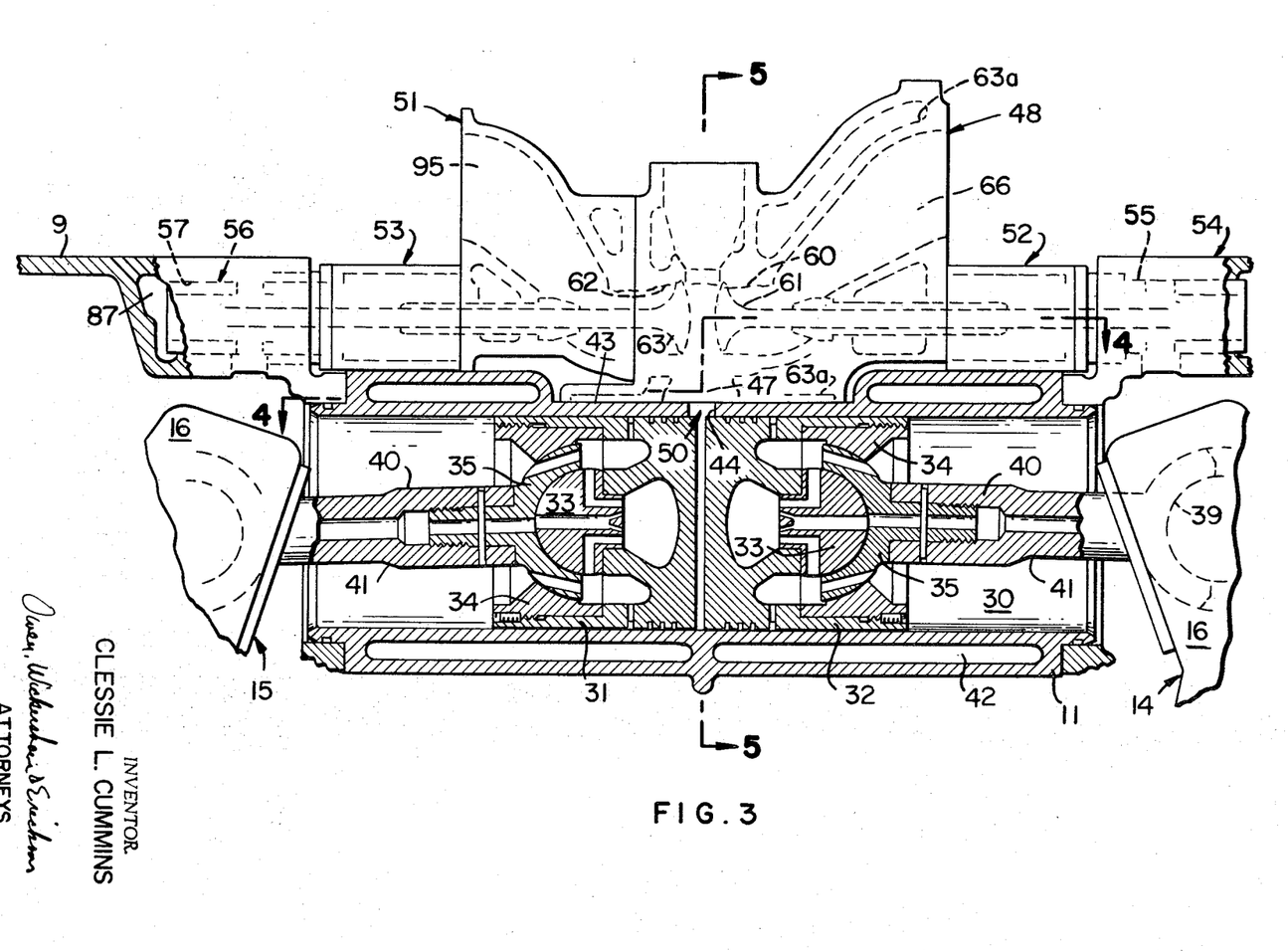
FIG. 3 is an enlarged view in elevation and partly in section of one cylinder and its associated valve assemblies.

Each cylinder body 11, 12, or 13 (see FIGS. 1—3) preferably provides one cylinder 30 and has two pistons 31 and 32. A more conventional type of engine block can be used, if desired, or the cylinders may be made in more than one piece. There are advantages in the single separate bodies shown. Each piston is preferably provided with a removable ball member 33 (FIG. 3) and a removable spherical-surfaced socket member 34 to receive a ball-socket member 35, and each converter unit 16 preferably has one recess 36 (FIG. 7) for each cylinder casting, in which is provided a ball member 37 and a spherical-surfaced socket member 38 that receive between them a ball-socket member 39. The two ball-socket members 35 and 39 are joined together to provide a connecting rod 40 having a stem portion 41 between their ball-socket portions. Thus, the pistons 31 and 32 are made to reciprocate with the thrust converters 14 and 15, the power from the fuel thereby being sent to the Z-crankshaft 10 and being converted from thrust into torque.

Figure 8:
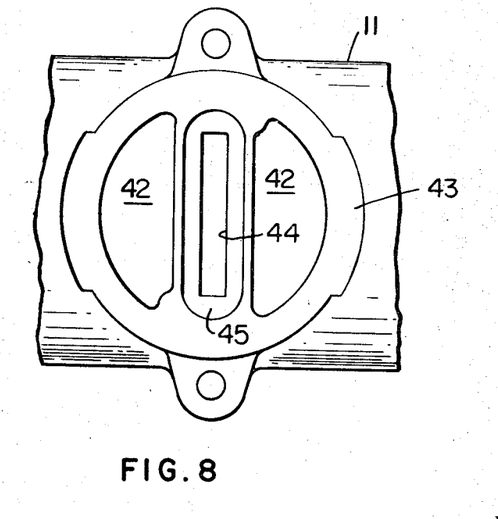
FIG. 8 is a top plan view of the central portion of the cylinder casting showing the combustion chamber slot therein, the surrounding gasket, and the two cooling chamber openings.

The pistons 31 and 32 are so connected to the thrust converters 14 and 15 that they move symmetrically toward each other for compressing the gaseous charge, and then after firing are moved away from each other symmetrically. The cylinder bodies 11, 12, 13 are all identical to each other, and so are the pistons 31, 32, and so are the combustion chambers and valves, so that the description of the one cylinder 30 with its associated parts suffices for the description of all of them. Each cylinder body 11, 12, 13 may be cast and bored to provide the very simple cylinder 30 (FIG. 3) and a suitable cooling means such as a water jacket 42 (or air jacket, for air cooling) which encircles the cylinder 30 except at one side of the center. The cylinder 30 is open at both ends for free operation of the connecting rods 40. At the center of each cylinder body 11, 12, 13 on one side thereof is a flat portion 43 (FIGS. 5 and 8) which may be partly a recess and partly a boss and into this at the center is machined a narrow slot 44, around which is a gasket seat 45 (FIG. 5) that receives a suitable gasket 46 —the only gasket at the only joint in the combustion chamber 50. The slot 44 extends down less than one-half the depth of the cylinder 30 and joins with an interior portion 47 of an exhaust-valve housing 48 to provide the combustion chamber 50 for the two pistons 31 and 32.

Figure 6:
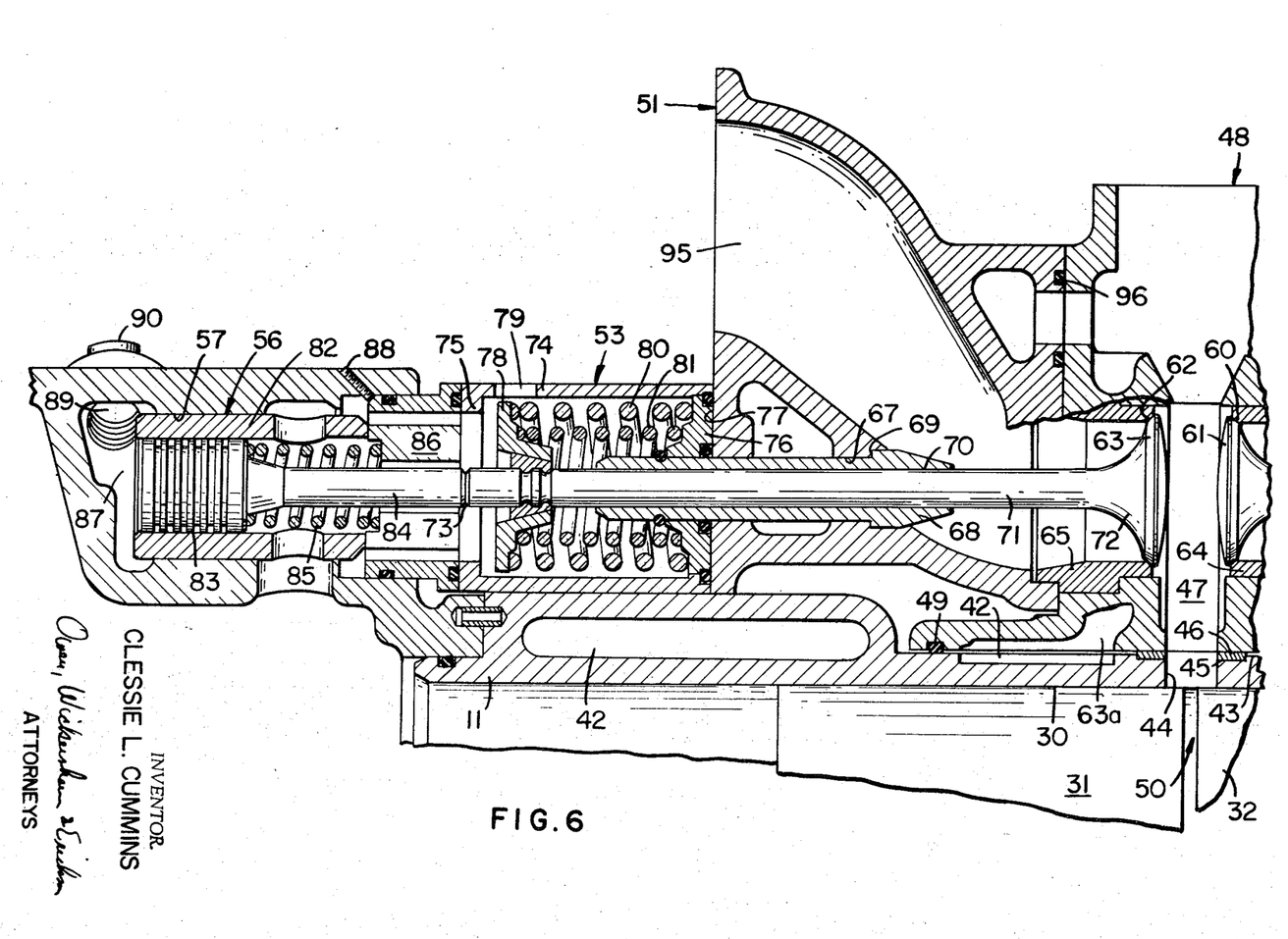
FIG. 6 is a further enlarged fragmentary view in elevation and in section of the intake-valve assembly and adjacent parts.

Atop the cylinder body 11, 12, 13 (*i.e.*, at one side of it) are the exhaust-valve housing 48 and an intake-valve cage or housing 51 (see FIG. 1), together with a pair of exhaust-valve alignment assemblies 52 and a pair of intake-valve alignment assemblies 53. As shown in FIG. 13, the cylinder bodies 11, 12, 13 can be rotated to positions such that the valve housings 48 and 51 need not be located at a radial extremity, for the sake of compactness and accessibilty of parts. In line with the exhaust-valve housing 48 and alignment assembly 52 (see FIGS. 3 and 6) is a hydraulic exhaust-valve actuating assembly 54, held by a recess 55 in the engine casing 9, while in line with the intake-valve housing 51 and its alignment assembly 53 is a hydraulic intake-valve actuating assembly 56, held by a recess 57 in the casing 9. For purposes of example and in order to describe a preferred embodiment of the invention, there are dual intake and exhaust valves for each cylinder. There may be only one of each, if desired, or there may be more.

Figure 5:
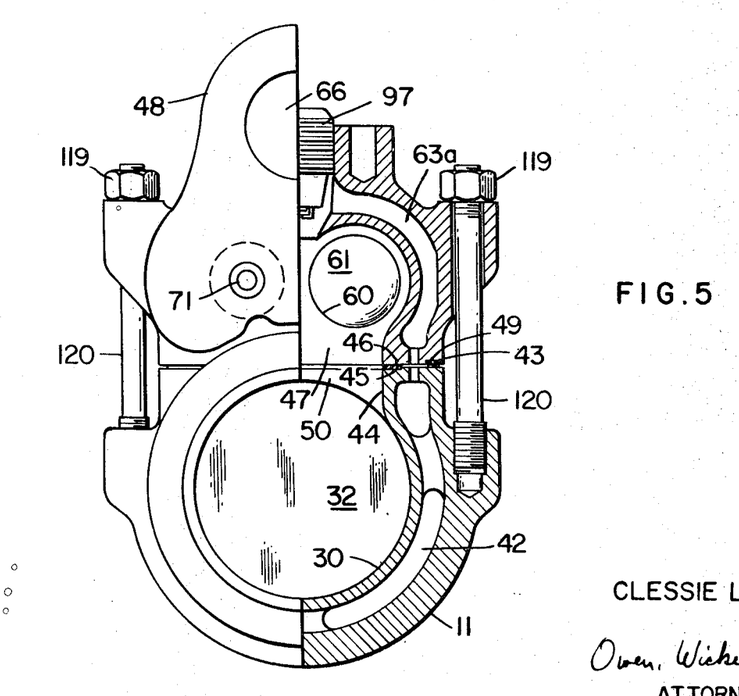
FIG. 5 is a view in section taken along the line 5—5 in FIGS. 3 and 4, but showing a spark plug instead of a fuel injector.

The exhaust-valve housing 48 is so constructed as to provide not only the seat retainers or ports 60 for the exhaust valves 61 but also the seat retainers or ports 62 for the intake valves 63. By having the exhaust-valve housing 48 extend past the slot 44 and past the entire combustion chamber 50, no gaskets other than the gasket 46 between the cylinder body 11, 12 or 13 and the exhaust-valve housing 48 (except for a gasket for a spark plug or the gasket-like seat of the injector) lie adjacent the combustion chamber 50, as would necessarily be the case if the exhaust- and intake-valve housings 48 and 51 were to be secured together at the combustion chamber 50 itself. By preventing that juncture at this point, major heat losses are also prevented, for it is axiomatic that wherever there is a joint, wherever two separate members meet, there are necessarily barriers to the transmission of heat to the water jacket. This is an important feature of the present invention. In a typical engine of this invention, the slot 44 is about 2½" by ½" and the gasket seat 45 is about 1¾" wide and recessed about 1/16" so that this one gasket 46 presents a very small exposed area and little bolt strength and pressure are required. Moreover, the seat 45 being recessed in the portion 43 of the cylinder casting, the gasket 46 is held snugly against being blown out through the very small clearance between the housing 48 and the face 43. An O-ring 49 seals around the water or air jacket. (FIG. 5).

The exhaust-valve housing 48 (see FIGS. 3 and 5) is a casting which has some machined surfaces. It is provided with a suitable cooling channel 63a for water or air, which is joined to the cooling channel 42 and lies on each side of the combustion chamber 50. Since the combustion chamber 50 is long and narrow with large-area flat walls, there is plenty of area for large exhaust and intake valves and ports, which are preferably in pairs. Each port 60, 62 is provided with a suitable seat 64, 65 (FIG. 6), which may be inserted tightly from one end or the other of the housing 48. An exhaust passage 66 (FIG. 3) leads from the port 60 up at an angle and out to a suitable manifold, not shown here.

In assembly, the exhaust-valve seats 64 (FIG. 6) are inserted through the opposite facing intake ports 62 and placed in position in the ports 60. Then the exhaust valves 61 are inserted through the intake ports 62, stems first, and put in place against their seats 64. Next the seats 65 and the intake valves 63 are placed in position in the ports 62, either together or the valves 63 inserted first. On disassembly, the seats 65 are taken out, then the valves 63, then the valves 61, and finally the seats 64, all through the intake ports 62. This can be done only when the intake-valve cage 51 is first removed. To enable this installation, the valves and ports need some degree of alignment. They may, as shown, all lie along axes parallel to the longitudinal axis of the cylinder 30, or they may be somewhat inclined to that axis so long as the angle of inclination does not prevent the installation and removal in the order described, once the intake cage 51 is removed. The intake valves 63 and ports 62 may be larger than the exhaust valves 61 and ports 60, and this helps in disassembly.

Figure 4:
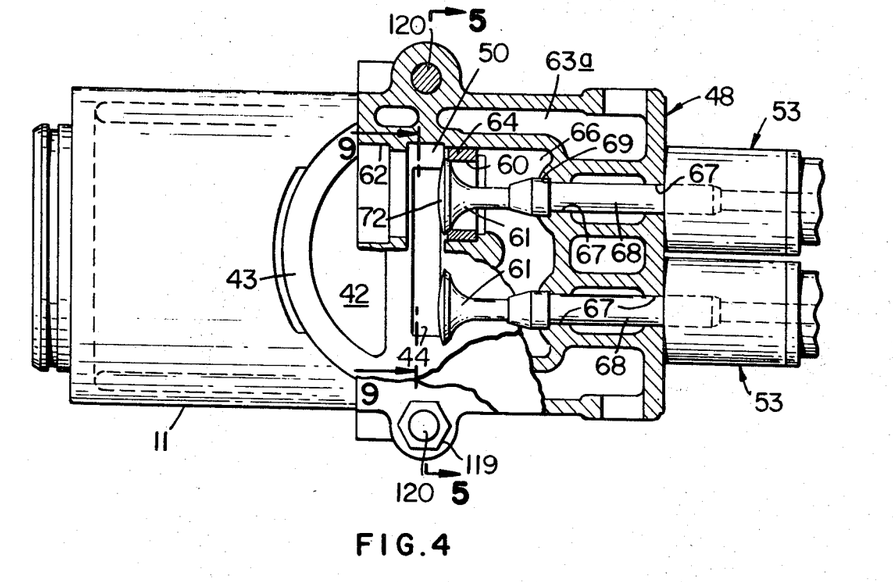
FIG. 4 is a view in section taken along the line 4—4 in FIG. 3.

Both housings 48 and 51 are also provided with openings 67 (see FIGS. 4 and 6), one aligned with each valve port 60 or 62 in which a valve stem guide 68 is secured, being seated against a shoulder 69 and having a smooth cylindrical bore 70 therethrough. Through this bore 70 a valve stem 71 extends from the head 72 of the valve 61 or 63. The stem 71 extends beyond the valve stem guide 68 and terminates at an outer end 73 a short distance within the end of the assembly 52 or 53. The valve stem guide 68 itself, which helps to provide a bearing for the reciprocating action of the valve 61 or 63, extends beyond the housing 48 or 51 into the assembly 52 or 53.

Each assembly 52, 53 (see FIG. 6) may comprise a simple housing 74, flat at each end to seat between the housing 48 or 51 and the assembly 54 or 56 and having an inturned edge 75 at the outer end. A spring seat 76 preferably surrounds the guide 68 and rests against the flat outer end 77 of the housing 48 or 51, while a spring bearing member 78 preferably surrounds and is secured to the valve stem 71 for movement with it. An opening 79 (normally plugged) enables observation of operation of the valves, or the assembly 52, 53 may be made from transparent strong plastic. Compressed between the seat 76 and the bearing member 78 are preferably two coaxial helical springs 80 and 81, to give maximum yielding pressure in a short length.

Each valve actuating assembly 54 or 56 preferably comprises a cylinder 82 (FIG. 6) fitting in the recess 57, with a piston 83 movable therein and having a stem 84 engaging the outer end 73 of the stem 71. The piston 83 is preferably urged outwardly by a spring 85 that seats against a seat member 86. The piston 83 and cylinder 82 cooperate with the casing 9 to provide a small chamber 87 to which hydraulic fluid is conducted by a conduit 90 or 112 (FIG. 1) and port 89 to actuate the piston 83 (FIG. 6) and thereby to unseat the valve head 72. The return is by the springs 80, 81 and 85. When the fluid pressure is off, as when the engine is not operating, the spring 85 urges the stem 84 of the piston 83 out beyond the end 75 of the housing 74, and entirely within the member 86 so that disassembly is simple. A set screw 88 provides a positive thrust against each seat member 86, the thrust being transmitted through the member 74 to the cage 51 (or housing 48). For disassembly, the set screw 88 is loosened.

Figure 9:
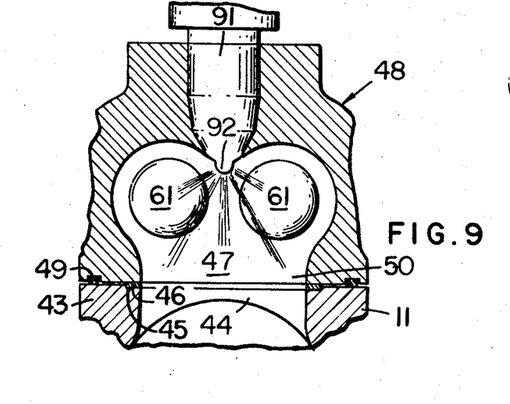
FIG. 9 is a fragmentary view in section of the upper portion of the combustion chamber taken along the line 9—9 in FIG. 4, showing a fuel-injector nozzle suitable for use in this invention, creating a flat-fan spray.
Figure 10:
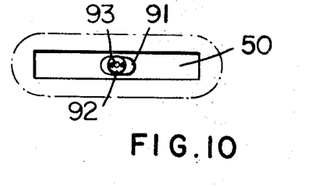
FIG. 10 is a head-on view of the nozzle of FIG. 9 and an adjacent portion of the combustion chamber.
Figure 11:
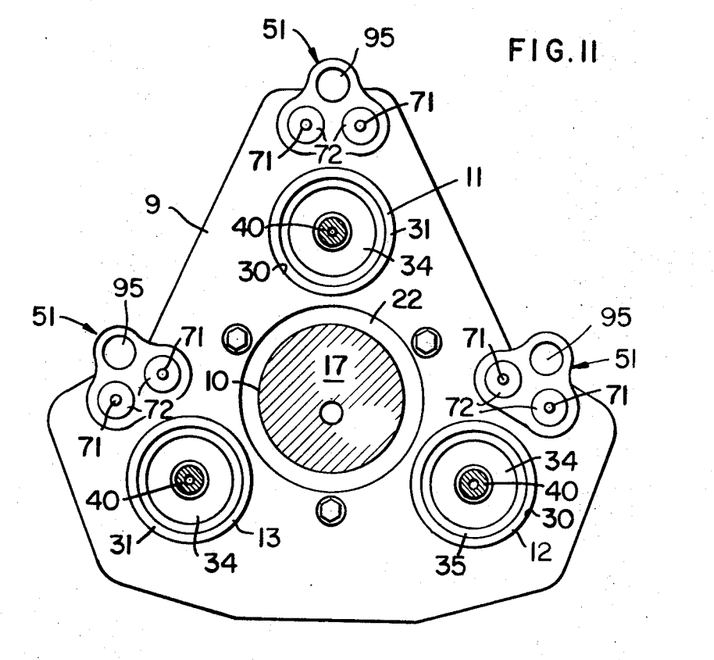
FIG. 11 is a simplified view in section of a three-cylinder engine, taken along the line 11—11 in FIG. 1, and omitting some parts.

A suitable fuel injector device 91 (FIGS. 9 and 10) is preferably provided centrally of the combustion chamber 50. In place of the fuel injector 91 a carburetor type of operation may be used with a fuel-air mixture that passes into the chamber 50, through the intake ports 62, a spark plug 97 (see FIG. 5) then being located at about the same point as that where the fuel injector 91 is shown in FIGS. 9 and 10. When a fuel injector 91 is used, its nozzle 92 is provided with a series of coplanar holes 93 which diverge outwardly to provide a flat fan-type spray, the shape of the spray being substantially the same shape as that of the chamber 50. Being in its own end wall, the injector 91 (or spark plug 97) does not affect the space available for the valves 61 and 63 and so does not limit the size of the valves.

The intake-valve cage 51 may be joined to the exhaust-valve housing 48 by a pair of bolts 94 (FIG. 7) and provides an intake passage 95 (FIG. 6) leading to the back of the intake valves 63. The seats 65 for the intake valves 63 are driven into the exhaust-valve housing 48, and the intake-valve cage 51 seats up against the housing 48 and is provided with suitable gaskets 96 joining it to the exhaust-valve housing 48.

An important feature of the invention is that both valves 61 and 63 and the injector 91 are hydraulically operated. In connection with this, the Z-crankshaft 10 preferably has a cylindrical portion 100 (see FIG. 1) which extends beyond the engine housing 9 and is preferably provided with an external gear 101. That gear 101 may mesh with another gear 102 held upon an auxiliary shaft 103 and provided with double the pitch diameter of the gear 101 so that (for a four-cycle engine) the shaft 103 rotates at exactly half the speed of rotation of the shaft 100. Upon this auxiliary shaft 103, which is a cam shaft, are mounted three cams 104, 105, and 106: one for the intake valve 63, one for the fuel injector 91, and one for the exhaust valve 61. If a spark plug is used instead of the fuel injector 91, there will be only two cams, one for each valve. No matter how many cylinders are used, the three cams are sufficient for a fuel-injector engine and two cams for a spark-plug engine. In two-cycle operation, the camshaft 100 rotates at the same speed as the crankshaft 10, which may even serve as the camshaft, if desired.

The firing order of a four-cycle, three-cylinder engine of this invention is one-three-two, with 240° of rotation of the crankshaft 10, or 120° rotation of the cam shaft 103 between cylinders and their valves and mechanisms. For a five-cylinder engine, the firing order is one-three-five-two-four. Each cam 104, 105, 106 engages a piston type of cam follower 107, 107a, 107b which moves in a cylinder 108, 108a, 108b in a housing 110 and exerts hydraulic pressure which is transmitted through a conduit 90, 111, or 112 to a chamber such as the chamber 87, opposite the mechanism to be fired. Thus, for the intake valve 63 the chamber 87 is connected by the conduit 90 to the master piston 107 which is actuated by the cam 104. When pressure is exerted, the piston 83 moves to the right in FIG. 6, and causes the valve 63 to move away from its seat 65. Upon release of the piston 107 by the cam 104, the spring 85 pressure forces the cam follower 107 to follow the cam 104, and the valve 63 is reseated by the springs 80 and 81. Thus, the pistons 107, 107a, and 107b are master pistons and the pistons 83 are slave pistons.

By using this hydraulic method of valve operation many advantages are noted. For instance, on a standard Cummins six-cylinder engine, 18 cams are required, and there are also 18 lower rocker-levers, 18 upper rocker-levers, 18 adjusting screws, 18 nuts, 18 push rods, plus many more small parts, such as rocker shafts, rocker housing castings, etc. Against that, my invention employs only three cams, nine master plungers, nine plunger chambers, and nine tubes to the injectors and valves. In addition, on the prior-art engine 18 valve adjustments must be made regularly, and 18 clearances at from .012" to .015" make a lot of noise when the engine operates. In my engine, there never is any such adjustment and no such sound because there are no clearances of this type. Also, few cams on a prior-art type engine are exactly alike, nor are all the motions of all the various parts exactly the same, and the adjustments vary, all affecting the running of the engine. Such maintenance adjustments are completely eliminated in my new engine, and the number of parts, the cost, and the noise are all reduced.

Figure 7:
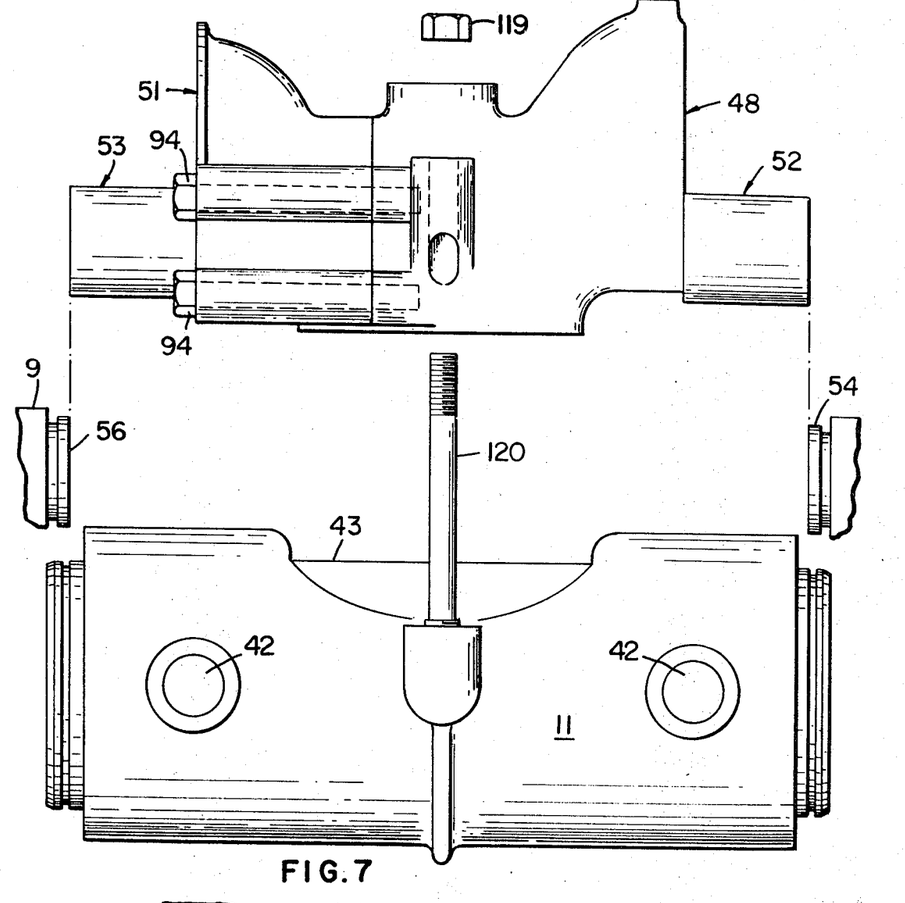
FIG. 7 is a partially exploded view in side elevation showing the intake-exhaust valve assembly and its associated cylinder.

As shown in FIG. 7, the structure of this engine enables a removal of the combination of the exhaust-valve housing 48, the intake-valve cage 51, and the alignment assemblies 52 and 53, and their contents, by loosening nuts 119 on studs 120 which hold the housing 48 down against the cylinder casting 11 and then simply lifting the whole together as a unit away from the other members. Thus, it is not necessary to detach the ends of the crankcase or to concern oneself with the cylinders at all in order to make this detachment. The assemblies 52 and 53 are simply taken off then. The intake-valve cage 51 then is separated from the exhaust-valve housing 48 by removing the four bolts 94 that hold them together. The valves, valve seats, etc., may then be removed for repair through the intake ports 62.

To those skilled in the art to which this invention relates, many changes in construction and widely differing embodiments and applications of the invention will suggest themselves without departing from the spirit and scope of the invention. For example, the combustion chamber structure with its opposed valves and separate walls for the intake valves, the exhaust valves, and the injector or igniter, may be used with conventional cylinders with advantage. As another example, the gasket 46 may be comprised of more than one gasket member. The disclosures and the description herein are purely illustrative and are not intended to be in any sense limiting.

I claim:

1. An internal combustion engine having at least one cylinder in a unitary body and a reciprocating piston in said cylinder characterized by:
   a housing bolted to said body and comprising a unitary member providing a combustion chamber connected to said cylinder by an axially narrow oblong port means, said combustion chamber having a cross-sectional shape similar to that of said port means and having two generally flat walls facing each other, and having valve openings leading into said combustion chamber from the flat walls on opposite sides of said combustion chamber;
   a single gasket means sealing between said housing and said body around said combustion chamber and constituting the only joint at said combustion chamber; and
   intake and exhaust valves in said valve openings, the intake valves being on one side and the exhaust valves on the other side and directly opposite the intake valves.

2. The engine of claim 1 having an intake valve cage removably secured to one side of said housing and having openings aligned with the valve openings on that side, each said valve opening having a valve seat, all said valves and valve seats being removable through the intake valve cage side of said housing upon removal of said intake valve cage from said housing.

3. The engine of claim 1 having a fuel injector in an opening in a wall other than the walls in which said valve openings are located.

4. The engine of claim 1 having a fuel injector at an end wall at the end of said combustion chamber farthest from said cylinder, said fuel injector having a nozzle with jets all in a single plane parallel to the major axis of said combustion chamber and sending out fuel in a flat fan-like spray.

5. The engine of claim 1 having ignition means in said combustion chamber at a location distant from said cylinder and in a different wall from that in which said valve openings are provided.

6. The engine of claim 1 having separate hydraulic means for actuating each said valve, including a cam-actuated master piston for the intake valves of each cylinder, a cam-actuated master piston for the exhaust valves of each cylinder, and hydraulic conduits connecting each said master piston to slave piston means bearing directly on stems for each said valve.

7. A combustion chamber for a fuel-injection engine, comprising a unitary housing member having two long flat walls and shorter side walls providing a chamber that is oblong in cross section and having an end wall having an injector opening therein, said two long walls each having a plurality of valve openings therein with exhaust and intake valve seats and valves in facing walls and directly opposite each other, whereby there is plenty of area available for said valve openings and said injector opening without crowding, so that large valves and a large injector can be used without unduly weakening the structure of said housing member, said intake valve openings being larger than said exhaust valve openings so that all said valve seats and valves can be withdrawn through said intake valve openings.

8. The combustion chamber of claim 7 wherein said unitary housing member is a single integral piece having a surface for securing an intake valve cage thereto and a surface for securing an exhaust manifold, said surfaces being parallel to each other, for low cost of manufacture, clean assembly appearance, and optimum gas flow.

9. The combustion chamber of claim 8 wherein a single gasket means at one open end of the housing member enables connection to an engine cylinder while providing only a single joint at said combustion chamber.

10. The combustion chamber of claim 7 wherein there is in said injector opening a fuel injector having a nozzle providing a series of substantially coplanar sprays, distributing a sprayed charge of fuel in a fan-shaped flat volume corresponding approximately to the shape of said combustion chamber.